United States Patent Office 3,655,610
Patented Apr. 11, 1972

---

3,655,610
FLUOROPOLYMER COATING COMPOSITIONS
Joseph A. Vasta, Woodbury, N.J., assignor to E. I. du Pont de Nemours and Company, Wilmington, Del.
No Drawing. Filed May 21, 1970, Ser. No. 39,575
Int. Cl. C08g 51/04
U.S. Cl. 260—39 R        10 Claims

ABSTRACT OF THE DISCLOSURE

A coating composition containing a tetrafluoroethylene/hexafluoropropylene copolymer, an epoxy resin, an aminoplast resin and zinc, all in an organic liquid, useful for lining water heaters and the like.

BACKGROUND OF THE INVENTION

As every homeowner knows, the interior surfaces of many water heater tanks manufactured for home use are coated with glass to minimize corrosion.

Glass, however, has many failings. First of all, it is brittle and subject to mechanical failure. Secondly, it dissolves slowly in water and so the lining thins over the years to the point where corrosion begins. Lastly, glass itself is porous and permits water to come in contact with the metal through the pores, which causes corrosion. Besides all this, lining a water heater tank with glass is an expensive operation because of the high temperature required in the fusion step and consequent need for heavy gauge metal.

I have found that these failings are minimized and that a tough, impermeable, long-lasting, organic polymeric coating can be applied to a water heater tank with less cost by using my compositions.

SUMMARY OF THE INVENTION

My coating compositions contain a tetrafluoroethylene (TFE)/hexafluoropropylene (HFP) copolymer, an epoxy resin, an aminoplast resin and zinc, all in an organic liquid.

The TFE/HFP copolymers I use in my compositions can be selected from a family of copolymers having TFE/HFP weight ratios of from 5–95/5–95. I prefer to use the 50–95/5–50 copolymers, even more the 75–95/5–25 copolymers and the 93–95/5–7, the 84–88/12–16 and the 75–80/20–25 copolymers, specifically the 95/5, 85/15 and the 75/25 copolymers. The 75–80/20–25 copolymers are most preferred.

Such copolymers and their preparation are described in U.S. Pat. 2,946,763 to Bro.

TFE/HFP copolymer is ordinarily present in my compositions at a concentration of from 5% through about 95%, preferably 25–75% and even more preferably about 50%, by weight of the binder components.

The epoxy resins I use in my compositions can be any of the well-known condensation products of bisphenol A[1] or bisphenol F[2] with epichlorohydrin, and having gram epoxy equivalent weights of 300–4000, preferably 400–2500. The epoxy resins I especially prefer for the quality of the finishes obtained when one uses them are the Epon 1001–1007 resins, sold by the Shell Chemical Company. The epoxy resins are ordinarily present in my compositions at concentrations from about 5% through about 90%, preferably 20–50% and even more preferably about 35%, by weight of the binder components.

[1] Para.para-isopropylidene diphenol.
[2] 4,4′-dihydroxydiphenylmethane.

The aminoplast resins I use in my compositions are condensates of formaldehyde with melamine, urea, benzoguanamine or melamine toluenesulfonamide. These resins can be prepared according to the directions in U.S. Pats. 2,197,357; 2,508,875 and 2,191,957. I prefer to use a benzoguanamine-formaldehyde resin because of the quality of the coating obtained when it is used.

The aminoplast resins are ordinarily present in my compositions at concentrations of from 5% through about 90%, preferably 5%–25%, even more preferably about 15%, by weight of the binder components.

The zinc used in my compositions can be in powder or flake form and is present at concentrations of from about 5% through about 400%, preferably 50–90%, and even more preferably about 70%, by weight of the binder components.

The organic liquid I use in my compositions is in the usual case a mixture of those which find their way into a composition as solvents or carriers for the solid and/or resinous components. These organic liquids are usually diacetone alcohol, aliphatic and aromatic hydrocarbons, ketones and the like. Generally speaking, the nature of these liquids is unimportant; it is necessary only that they be compatible with the components of the composition and that they have no adverse effects on the coating itself.

While it is not necessary that my compositions contain a pigment, I have found that the integrity of the resulting films is improved if the compositions contain from about 5% through 100%, preferably 25%–75%, even more preferably about 50%, by weight of the binder components, of $TiO_2$.

The stability and blister resistance of coatings derived from my compositions are also enhanced by adding to the compositions from about 1% through about 5%, by weight of the binder components, of a hydrophobic silica such as that sold by the Philadelphia Quartz Company as "QUSO." I preferably use from about .5% to about 1.5%, even more preferably 1%, of this material.

My compositions can be made by adding suitable amounts of all of the components to a vessel and then pebble-milling or ball-milling the resulting mixture for from 10 to 18 hours, or until the TFE/HFP copolymer is wetted and deagglomerated. The resulting dispersion will ordinarily contain from about 50% to about 80% (by weight) of solid material, preferably 50%–60%.

This dispersion should then be reduced to spray viscosity with a suitable thinner such as diacetone alcohol or an aromatic naphtha. It can then be sprayed directly on the surface to be coated. It is an advantage of my compositions that they can be applied directly on grit blasted steel. Expensive pretreatments like Bonderizing or Alondinizing are unnecessary.

While one such coating gives some corrosion protection, I have found that my compositions give the best possible protection if three separate coats are applied, each about one mil thick (dry) and each baked after application for 10 minutes at 475° F.—600° F. The final coating is preferably baked for 20 minutes at 475° F.–600° F.

While my compositions are most useful for coating the interior surfaces of water heater tanks, they are also unsful for lining boilers, the interior surfaces of pipes and drum, indeed any surface which must come in contact with water at elevated temperatures.

DESCRIPTION OF THE PREFERRED EMBODIMENTS

One skilled in the art will be able to practice my invention more easily after reading the following illustrative examples. All parts are by weight.

EXAMPLE 1

A composition was prepared by mixing together

| | Parts |
|---|---|
| TFE/HFP 75/25 copolymer | 227 |
| Epon 1007 resin | 400 |
| Benzoguanamine-formaldehyde resin (66% solids in butanol) | 102 |
| Diacetone alcohol | 88 |
| Solvesso 100 | 88 |

This dispersion was ground in a pebble mill until the solids were reduced to a diameter of 10–20 mils. To this composition were then added 482 parts of zinc dust.

The composition was mixed, thinned to spray viscosity with Solvesso 100 and applied to a grit-blasted steel panel in three separate coats. The first two coats were applied to a thickness of 1 mil (dry) and baked for 10 minutes at 475° F. The third coat was applied at the same thickness, but baked for 20 minutes at 475° F. Electrical measurements showed the coating was conductive, with no detectable electrical resistance. The panels withstood immersion in hot water (180° F.) for 30 days with no noticeable deterioration of the coating or corrosion of metal.

EXAMPLE 2

A composition was prepared by mixing together:

| | Parts |
|---|---|
| Titanium dioxide | 16.81 |
| Hydrophobic slica (QUSO–51) | 0.34 |
| TFE/HFP 75/25 | 16.81 |
| Benzoguanamine-formaldehyde resin (66% solids in n-butanol) | 7.63 |
| Diacetone alcohol | 14.5 |
| Solvesso 150 | 14.5 |
| Epon 1007 | 29.4 |

The resulting dispersion was pebble-milled for about 18 hours.

To 65.6 parts of this dispersion were added 33.3 parts of zinc dust, 0.5 part of Solvesso 100 and 0.5 part of diacetone alcohol.

This was mixed thoroughly, reduced to spray viscosity with Solvesso 100 and then applied to a steel panel as in Example 1, with substantially the same result.

What is claimed is:

1. A composition comprising
   (A) from 5% through about 95%, by weight of the total of (A), (B), (C) and (D) solids, of a 5–95/5–95 TFE/HFP copolymer;
   (B) from 5% through about 90%, by weight of the total of (A), (B), (C) and (D) solids, of a condensation product of bisphenol A or bisphenol F and epichlorohydrin;
   (C) from 5% through about 90%, by weight of the total of (A), (B), (C) and (D) solids, of an aminoplast resin;
   (D) from 5% through about 400%, by weight of the total of (A), (B), (C) and (D) solids, of particulate zinc; and
   (E) an organic liquid carrier.

2. The composition of claim 1 aditionally containing from about 0.1% through about 5%, by weight of the total of (A), (B), (C) and (D) solids, of hydrophobic silica.

3. The composition of claim 1 additionally containing from about 5% through about 100%, by weight of the total of (A), (B), (C) and (D) solids, of $TiO_2$.

4. The composition of claim 1 containing silica as in claim 2 and $TiO_2$ as in claim 3.

5. The composition of claim 4 wherein the (B) component is a benzoguanamine-formaldehyde resin.

6. Metal bearing a dry fused coating of the composition of claim 1.

7. Metal bearing a dry fused coating of the composition of claim 2.

8. Metal bearing a dry fused coating of the composition of claim 3.

9. Metal bearing a dry fused coating of the composition of claim 4.

10. Metal bearing a dry fused coating of the composition of claim 5.

References Cited

UNITED STATES PATENTS

| 3,484,503 | 12/1969 | Magner et al. | 260—900 |
| 3,533,977 | 10/1970 | Read | 260—900 |

LEWIS T. JACOBS, Primary Examiner

U.S. Cl. X.R.

260—37 EP, 41 B; 117—132 A